United States Patent [19]
Goddard

[11] Patent Number: 6,068,763
[45] Date of Patent: May 30, 2000

[54] SPIN-ON OIL FILTER WITH REPLACEABLE ELEMENT

[75] Inventor: Henry B. Goddard, Fayetteville, N.C.

[73] Assignee: Purolator Products Company, Fayetteville, N.C.

[21] Appl. No.: 08/928,816

[22] Filed: Sep. 12, 1997

[51] Int. Cl.[7] .................... B01D 35/147; B01D 35/153
[52] U.S. Cl. .................... 210/130; 210/136; 210/440; 210/450; 210/453; 210/455; 210/DIG. 17
[58] Field of Search ................... 210/130, 136, 210/430, 440, 443, 444, DIG. 17, 133, 450, 453, 454, 457, 455; 123/196 A; 137/543.21

[56] References Cited

U.S. PATENT DOCUMENTS

| | | | |
|---|---|---|---|
| 3,333,703 | 8/1967 | Scavuzzo et al. | 210/DIG. 17 |
| 4,366,837 | 1/1983 | Roettgen | 210/130 |
| 4,906,365 | 3/1990 | Baumann et al. | 210/238 |
| 5,589,060 | 12/1996 | Gebert et al. | 210/130 |
| 5,753,116 | 5/1998 | Baumann et al. | 210/206 |

*Primary Examiner*—Matthew O. Savage
*Attorney, Agent, or Firm*—Barnes & Thornburg

[57] ABSTRACT

An improved, reduced waste oil filter has a concave housing having a first end, a fluid inlet port and a fluid outlet port. A concave cover is removably and sealably attached to a second end of the housing providing a closed area with which the inlet and outlet ports communicate. An elongated cylindrical disposable oil filter element is supported within the closed area. The filter element has a perforated center tube, a first end of which detachably communicates with the fluid outlet port, the other end of the center tube being closed. The center tube has a filter media there around so that fluid flow into the closed area through the inlet port flows through the filter media and into the center tube to pass out through the outlet port. The filter element has a length greater than the internal depth of the cover so that when the cover is removed from the housing a portion of the length of the filter element extends exteriorly of the cover to facilitate easy removal and replacement. The housing and cover are intended for long term use, therefore only the disposable filter element itself is discarded. In a preferred arrangement the filter includes bypass and waste reducing anti-drain back valves.

13 Claims, 6 Drawing Sheets

SPIN-ON OIL FILTER WITH REPLACEABLE ELEMENT

CROSS-REFERENCE TO RELATED APPLICATIONS

This application is not related to a pending patent application.

CROSS-REFERENCE TO MICROFICHE APPENDIX

This application is not related to a microfiche appendix.

BACKGROUND OF THE INVENTION

This invention relates to an oil filter of the type that is normally used on internal combustion engines, such as automobile, bus, truck and boat engines although oil filters are also standard equipment for stationary engines. Oil used to lubricate an internal combustion engine entrains solid contaminants as the consequence of engine performance, that is, lubricating oil picks up carbon deposits that results from burning of fuel, debris resulting from engine wear, rust from metal engine components and so forth. Unless these solid materials are extracted from a circulating lubricant, the life expectancy of an engine can be decreased. Accordingly, virtually every internal combustion engine of any significant size, employs, as an important part thereof, an oil filter. Engine manufacturers prescribe periodic replacement of oil filters.

The most common type of oil filter in use today, particularly for vehicle engines, is a disposable filter in which the filter housing, having the filter element therein, is factory sealed. When the typical oil filter must be replaced it is necessary that the entire filter assembly, including the housing, mounting plates, bypass valve system, anti-drain back system and so forth that make up a filter be removed as a unit and discarded. Since frequent filter changes are recommended by engine manufacturers a huge number of oil filters are disposed of daily in the United States and all other industrialized countries of the world. Disposing of oil filters that include the entire metal housing, mounting plate, filter element, valve structures, etc., represent a serious source of contamination of the environment. The typical oil filter in use today can be disposed of only in a landfill, that is, the typical oil filter cannot be disposed of by burning to produce useable heat because of the substantial metal components and since the only combustible components are shielded within the metal housing.

In addition to the increased burden placed on the environment by metal housed disposable oil filters in use today, the currently popular replacement oil filters are more expensive than necessary.

An object of the present invention is to provide an improved oil filter in which the filter housing is intended for permanent, or at least long term use, on an internal combustion engine.

Another object is to provide an oil filter system in which the filter element consisting substantially entirely of easily combustible components so that it can be disposed of by burning rather than burial in a landfill. Accordingly, this invention achieves not only economy of filter replacement but a significant reduction in the burdens imposed on landfills or other trash disposable systems that are imposed by the huge number of metal housed oil filters that must be disposed of each day in the world.

Another objective is to reduce the amount of waste during an oil change by providing a filter system having a permanent valving arrangement.

In addition to providing more economical and environmentally acceptable oil filters, this invention provides waste reducing anti-drain back and bypass valve structures.

BRIEF SUMMARY OF THE INVENTION

This invention provides oil filters for extracting entrained solid components from the lubrication systems of internal combustion engines. Most specifically, an economical and environmentally acceptable improved oil filter for cars, trucks, buses, boats and so forth is disclosed.

The improved oil filter includes a rigid housing designed essentially to be permanently or at least semi-permanently affixed to an internal combustion engine. The housing has a first end that is attached to an engine, the attachment end being in the form of an integral mounting end plate that has a fluid inlet port or ports and a fluid outlet port. In a typical arrangement a fluid outlet port is centrally positioned in the housing end plate and fluid inlet is in the form of a plurality of openings spaced around and away from the fluid outlet port. Usually the fluid outlet port also functions as a means of mounting the housing to an engine. For this purpose, the fluid outlet port is internally threaded so that the housing can be threaded onto a male externally threaded member that supports the housing to an engine.

A concave cover is removably and sealably attached to a second end of the housing. When the cover is attached to the housing a closed area is formed with which the outlet and inlet ports communicate.

Mounted within the enclosed area formed by the housing and cover is a disposable filter element. The filter element has a perforated center tube, a first end of which is in detachable communication with the housing end plate fluid outlet port. The second end of the center tube is closed. In one arrangement (which will be described in detail) the perforated center tube second end is closed by a bypass valve.

Formed around the center tube is filter media formed of material that permits the flow of oil therethrough but which intercepts solid components. In some cases the filter media may also absorb and retain water flowing in the lubricant, however, the normal function of the filter media is to intercept solid contaminants. The filter media is formed around the center tube in such a way that the lubricant oil can normally flow from the housing inlet port or ports to the housing outlet port only by passing through the filter media. If the filter media becomes clogged with solid components so that the fluid pressure necessary to force lubricant flow through the filter media builds to a preselected high level, then in the preferred embodiment of the filter a bypass valve is forced open to permit lubricant flow from the housing inlet port or ports, through the bypass valve into the center tube and out the outlet port without passing the filter media. However, such occurs only in an emergency situation wherein the filter media has become clogged with solid contaminants, otherwise the intent of the filtration system is that all lubricant fluid flow take place through the filter media.

The center tube is typically tubular, that is, with an external cylindrical surface that receives the filter media thereon, the filter media being, for example, pleated filter paper. The filter element has a length that is greater than the internal depth of the concave cover. This arrangement is important in that it permits easy removal and replacement of the filter element. That is, the depth of the concave cover is such that when the cover is threadably removed from the housing, a portion of the length of the filter element extends outside the cover so that a repairman can easily grasp the filter element, remove it from the cover and replace it with a new filter element without requiring the use of tools.

As above stated, in one embodiment of the invention the filter element includes a bypass valve in the form of a tubular element, preferably of plastic, that is received within the second end of the center tube. The tubular valve structure has a passageway therethrough that is normally closed by a valve disc. A spring urges the valve disc into sealing engagement with a valve seat formed as an internal flange within the tubular valve element surrounding the fluid passageway.

An important advantage of the filter of this disclosure is that the removal and replacement of the filter element is simplified. This improvement is in the form of an attachment means by which the filter element is retained in the concave cover when the cover is unthreaded from the housing. By retaining the filter element within the cover, the possibility of spillage of oil from the filter is reduced and the disposal of the spent filter element is more easily accomplished. That is, when the concave cover is removed that contains the filter element, the cover having the filter element therein may be placed over a waste container to catch any spilled or dripping oil as the spent filter element is removed from the cover. To retain the spent filter element in the cover when the cover is removed from the housing, integral upstanding probes are formed on the interior of the cover that removably grasps the tubular body of the bypass valve. This is accomplished by providing an interior circumferential groove in the tubular body that receives outwardly extending projections from the probes.

The improved filter of this invention includes, in addition to the bypass valve, an anti-drain back valve system to prevent the flow of oil from interior of the filter housing back through the inlet port or ports. In many instances an oil filter attached to an engine is located elevationally above portions of the engine, thus, without some provision to prevent drain back, when the engine is not running and no engine oil pressure exists, oil may drain by gravity back into the engine. For this reason, better quality oil filters include an anti-drain back valve system. In one embodiment of this invention an anti-drain back valve is provided by an elastomeric disc that surrounds the housing outlet port and extends circumferently to cover the inlet ports. The elastomeric disc deflects to permit oil flow through the inlet ports into the interior of the housing but covers the inlet ports to prevent oil from flowing backwards out through the inlet ports. This elastomeric anti-drain back valve element preferably also functions as a seal to seal one end of the filter element, specifically one end of the perforated center tube, to the filter outlet port. It may be desirable to replace the anti-drain back flexible valve disc when a filter element is replaced and this can easily be accomplished since the elastomeric disc can easily be slipped off from around the oil outlet port.

In another embodiment the anti-drain back valve system is permanently formed as a part of the housing. This is achieved by providing a valve in conjunction with each inlet. In an illustrated embodiment a permanently mounted anti-drain back valve is formed by providing an enlarged recess in the integral housing end plate surrounding each inlet port. A spring, a valve disc and a valve seat insert is then fitted into the enclosure. The valve seat insert has a passageway therethrough for the passage of oil into the inlet port that is smaller in area than the recess so that an integral seating flange is formed. The valve disc is forced by the spring against the insert seating flange to prevent the backward flow of oil from the interior of the housing through the inlet port.

In another embodiment of the invention, in addition to having a bypass valve and anti-drain back valves, an outlet port anti-drain valve is formed in the housing. A recess is formed at the housing outlet port that receives a valve disc and spring and receives a valve seat insert that is press fitted into the outlet port, the valve seat insert having an opening therethrough forming a valve seat. The spring urges the disc in sealed contact with the valve seat which is displaceable by the pressure of oil flow through the filter. When no fluid flow pressure exists the outlet port anti-drain valve is closed. This third valve prevents drainage of oil from the outlet port when the cover is removed from the housing during filter element replacement.

In still another embodiment of the invention, provision is made so that it is not necessary to mount a bypass valve as a portion of the filter element. At least one bypass valve is formed in the housing end plate portion that is in parallel with inlet ports as previously described. A circumferential grommet normally closes the perforated tube to the housing. The grommet is constructed so that the flow of oil, after passing through a bypass valve flows past a circumferential lip portion of the grommet, allowing the oil to flow directly from the bypass valve into the interior of the perforated tube and thus into communication with the outlet port.

The improved oil filter disclosed herein is convenient to use, is economical, and achieves dramatic reduction in waste disposal volumes compared to the usual metal housed disposable oil filter. The improved filter designs as disclosed herein provide valve structures that prevent oil drain back, provide for oil flow bypass, and prevent unwanted drainage of oil through the outlet port during filter element changes.

A more complete understanding of the invention will be obtained from the following description of the preferred embodiments taken in conjunction with the attached drawings.

DESCRIPTION OF THE DRAWINGS

FIG. 9 shows a more elongated filter element and cover. More particularly, FIG. 9 shows, in addition to the bypass valve as shown in FIG. 1, a different anti-drain back valve system, one that is contained within the housing so that no portion of the anti-drain back valve system need be replaced when the filter element is replaced. Further, FIG. 9 shows the employment of an anti-drain valve forming a part of the housing fluid outlet port so that leakage of oil from the outlet port is prevented during changes of the filter element.

DESCRIPTION OF THE PREFERRED EMBODIMENTS

Figure 1:
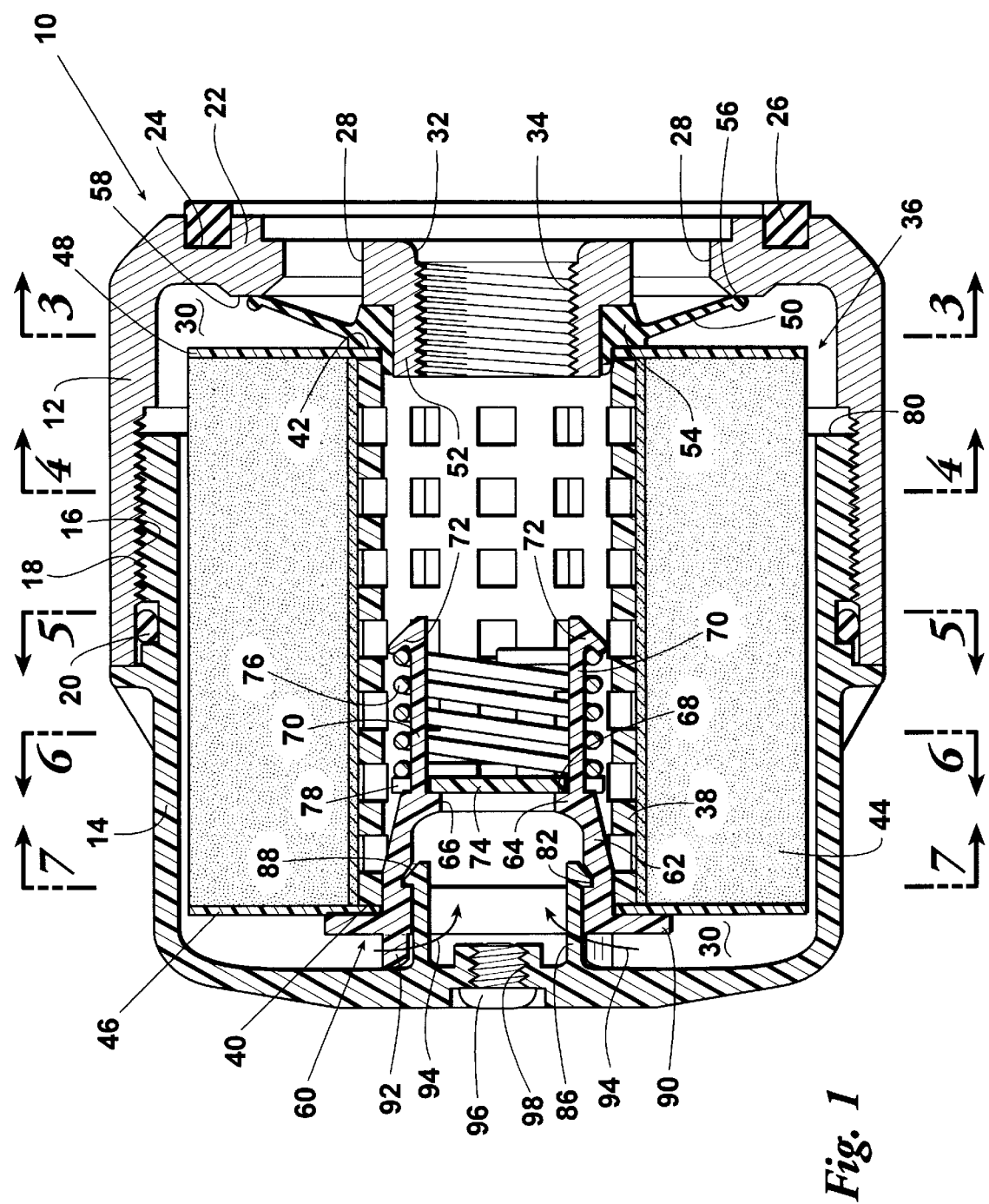
FIG. 1 is an elevational cross-sectional view of a fluid filter, exemplified as an oil filter, and particularly exemplified as an oil filter of the type employed for use on internal combustion engines as used in cars, trucks, buses, boats and so forth. The oil filter is shown in elevational cross-sectional view showing a filter housing and cover that together form an enclosure in which is positioned a filter element. The filter element is replaceable without the requirement of replacing the housing and cover to thereby minimize the volume of material that must be discarded to change an oil filter.
Figure 8:
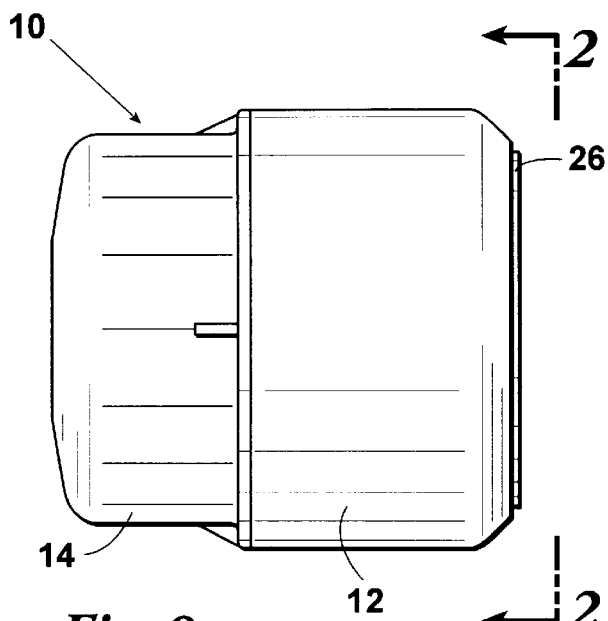
FIG. 8 is a reduced scale, external view of the oil filter of FIG. 1.
Figure 2:
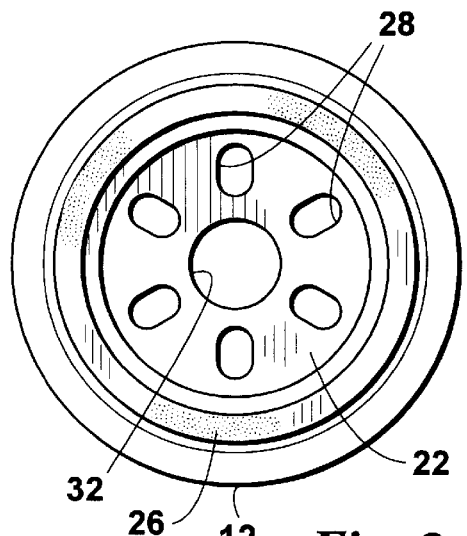
FIG. 2 is an end view of the housing of FIG. 1, taken along the line 2—2 of FIG. 8.
Figure 3:
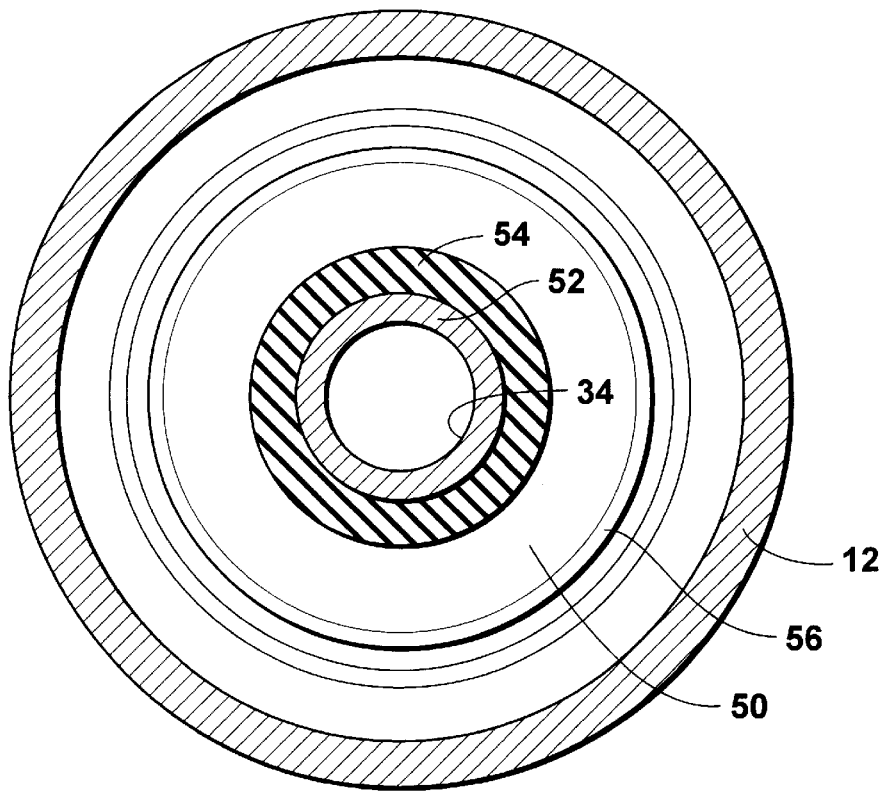
FIG. 3 is a cross-sectional view taken along the line 3—3 of FIG. 1 showing one embodiment of an anti-drain back valve system of this invention.
Figure 4:
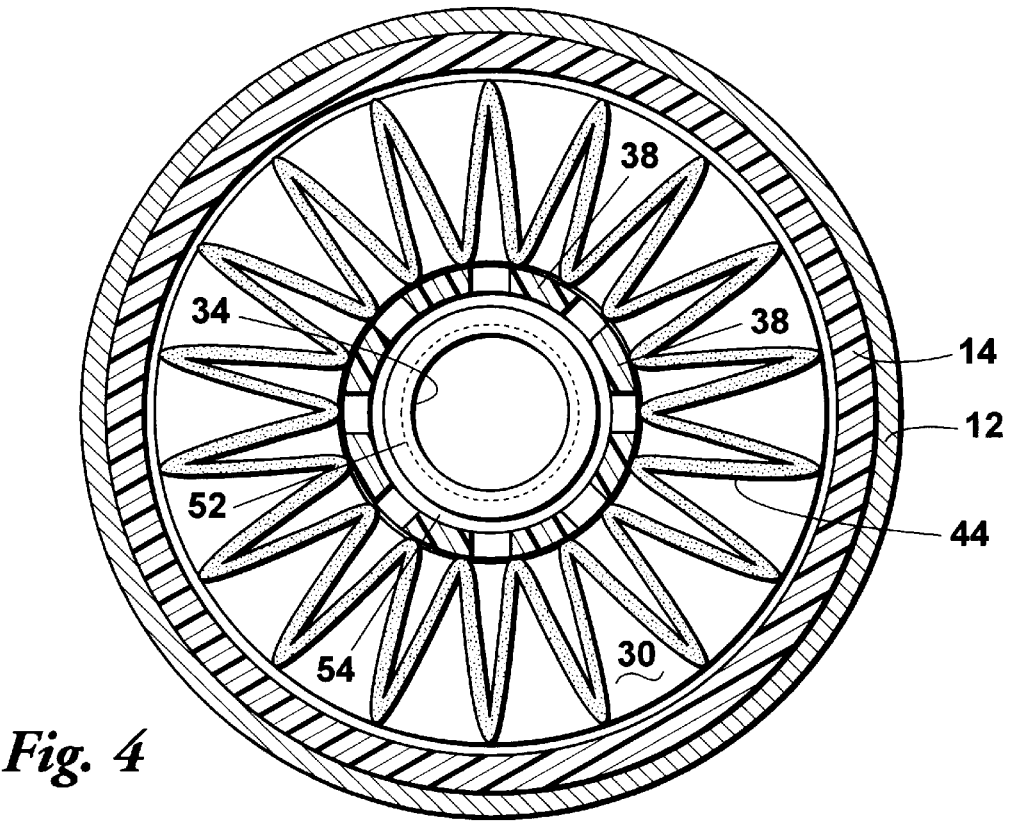
FIG. 4 is a view taken along the line 4—4 of FIG. 1 showing the cross-sectional relationship between the housing sidewall, the cover, a pleated paper filter element and a perforated center tube.

Referring to the drawings and first to FIGS. 1, 2 and 8, a representative fluid filter that incorporates basic principles of the invention is illustrated. The numeral 10 indicates an oil filter as employed on virtually all automobile, truck, bus and boat internal combustion engines. Filter 10 includes, as two basic components, a housing 12 and a cover 14. Cover 14 is threadably attached to housing 12, that is, housing 12 has internal threads 16 and cover 14 has external threads 18. Cover 14 is sealably secured to housing 12 by an O-ring gasket 20, although the specific sealing arrangement can vary.

Housing 12 has, as seen in FIG. 1, a first end that is in the form of an integral mounting plate 22 having a circumferential groove 24 that receives a gasket 26, the gasket being seen also in FIGS. 2 and 8.

Formed in internal mounting plate 22 are a plurality (6 being shown) of fluid inlet ports 28. These inlet ports communicate with the interior chamber 30 formed by housing 12 and cover 14. Centrally formed within mounting plate portion 22 is a central outlet port 32 having internal threads 34 therein. Inlet ports 28 are spaced circumferently around outlet port 32. Filter 10 is attached to an internal combustion engine by rotating housing 12 to thread outlet port 32 onto an externally threaded tubular support (not seen) so that gasket 26 sealably engages a planar sealing surface (not shown). The sealing surface (not shown) has oil flow channels in communication with inlet ports 28. Thus, in a manner that is typical of the way that oil filters are commonly attached to an internal combustion engine, the housing 12 is threaded onto an externally threaded tubular member to simultaneously make attachment to an engine lubrication system that includes flow channels that provide communication with fluid filter inlet port 28 and outlet port 32.

Figure 13:
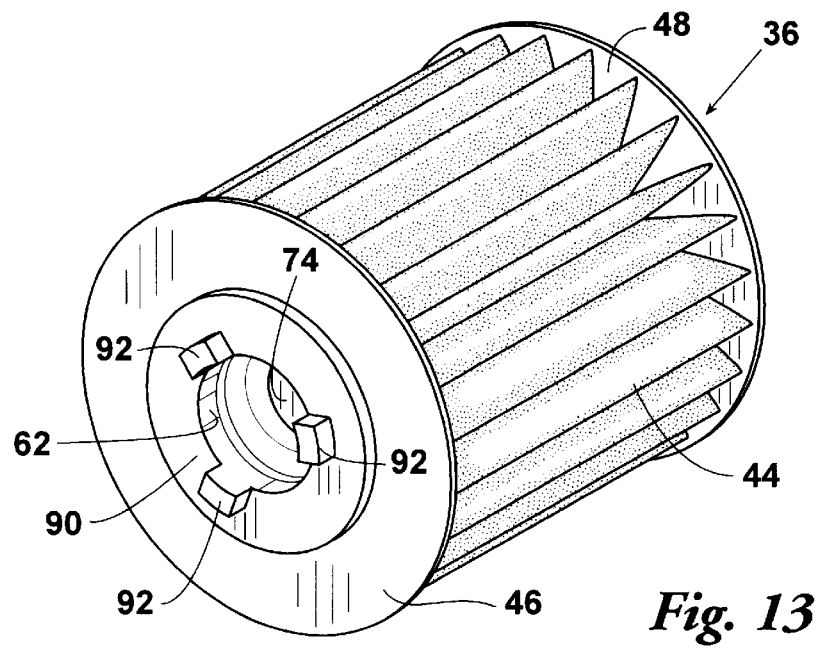
FIG. 13 is an isometric view of the filter element as employed in the embodiment of the filter shown in FIGS. 1 through 8.

Positioned within interior chamber 30 is a filter element generally indicated by the numeral 36, that is illustrated in isometric view in FIG. 13. Filter element 36 is formed around a rigid perforated center tube 38. Perforated center tube 38 has a first end 40 and a second end 42.

Filter media 44 is formed about center tube 38. While the filter media may take a variety of forms, a commonly employed filter media is made of pleated filter paper as illustrated in FIG. 13 and in cross-sectional views in FIGS. 4 through 7. To add rigidity and to close off the ends of pleated filter paper 44, the filter element includes a first end plate 46 and a second end plate 48. End plates 46 and 48 are sealed or bonded to the ends of pleated filter paper 44 and to the ends 40 and 42 respectively of center tube 38.

In one embodiment of the invention, though not illustrated herein, first end plate 46 could be circular without an opening therein to close off first end 40 of center tube 38. However, in the preferred arrangement as illustrated, the first end 40 of center tube 38 has positioned therein a bypass valve structure which will be described subsequently.

The flow path through filter 10 of FIG. 1 is as follows: fluid (oil) flows from the apparatus to which the filter is attached, such as an internal combustion engine, through inlet ports 28 into interior chamber 30, through the filter media 44 of filter element 36, through perforated center tube 38 and out of the filter through outlet port 32. Thus, the flow path is such that the oil must flow through the filter media where entrained contaminants, particularly solid contaminants, are extracted.

It is desirable that some means be employed to prohibit fluid contained within the filter from passing back into the apparatus (internal combustion engine) to which the filter is attached. Interior chamber 30 formed within the housing essentially contains dirty or contaminated oil as a consequence of contaminants accumulated within this area. To prevent this contaminated oil from inadvertently passing back into an engine, better oil filters include an anti-drain back system. The anti-drain back system of FIG. 1 is in the form of a flexible elastomeric disc 50 that fits telescopically on a central, inward tubular extension 52 of housing mounting plate portion 22. Elastomeric disc 50 has an annular central portion 54 with an outwardly extending circumferential flange portion as illustrated. The flange portion provides a circumferential seal 56 against an annular interior surface 58 of housing mounting plate portion 22. The flexible elastomeric disc 50 is easily displaced by oil flow inwardly through inlet ports 28 but circumferential seal 56 closes against annular interior surface 58 to prevent the flow of oil out of interior chamber 30 through inlet ports 28, thus serving to prevent oil drain back.

Elastomeric disc annular portion 54 provides another important function, that is, it serves as an elastomeric seal for the second end 42 of filter element 36.

In addition to an anti-drain back valve system better oil filters include a bypass valve system. As the filter functions to entrap contaminants from an oil stream, these contaminants build up on the intake surface of filter media 44. As contaminants accumulate, resistance to flow through the filter media increases. If the filter is not timely replaced, resistance to flow can increase to the point that insufficient oil flow occurs. For this reason, it is important that a system be provided that permits emergency bypass of fluid flow around filter element 44. In the filter of FIG. 1, the bypass valve system is indicated generally by the numeral 60 and includes a plastic tubular housing 62 that provides an integral inwardly extending internal flange portion 64 having a fluid passageway 66 therethrough, the flange portion 64 providing a valve seat 68.

Figure 5:
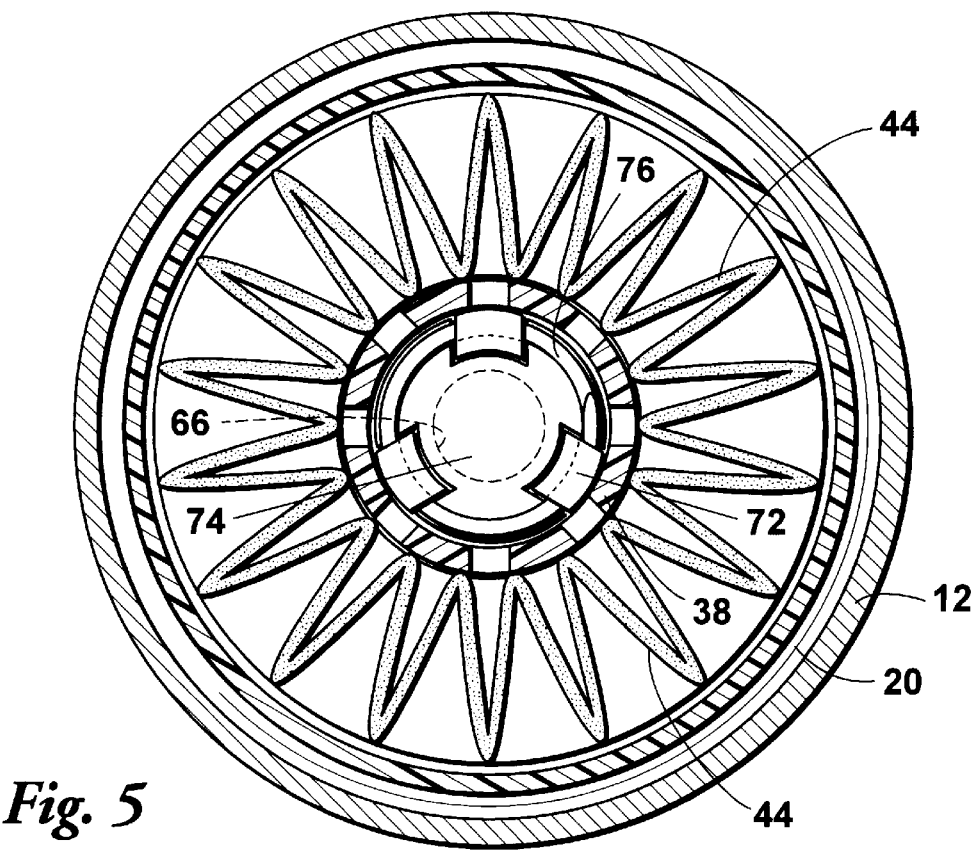
FIG. 5 is a cross-sectional view taken along the line 5—5 of FIG. 1 showing portions of a bypass valve.
Figure 6:
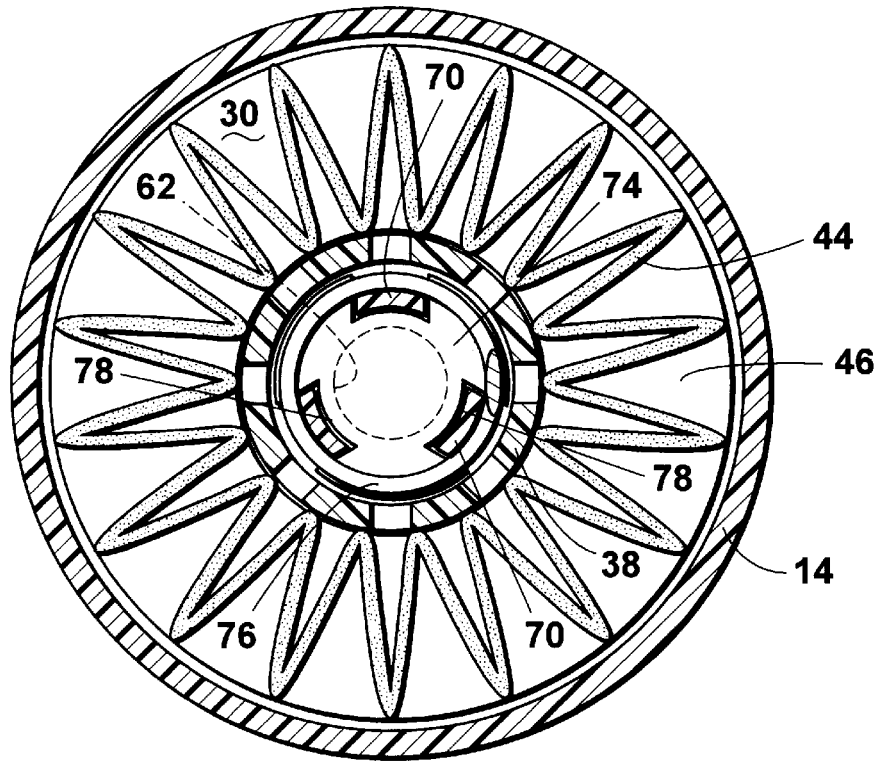
FIG. 6 is a cross-sectional view taken along the line 6—6 of FIG. 1 showing more details of a bypass valve.

Integrally extending from tubular housing 62 beyond valve seat 68 are spaced apart legs 70 (three being shown in the drawings) seen in FIGS. 5 and 6. The end of each of legs 70 terminates in an outwardly extending hook portion 72.

A planar valve disc 74, which also may be termed a valve plunger, is positioned so that it is normally in contact with valve seat 68. A coiled spring 76 is positioned between disc 76 and hook portions 72. Valve disc 76 has notches 78 in its peripheral surface (see FIG. 6) that slidably receives legs 70. Thus, spring 76 resiliently urges valve disc 74 into sealing contact with valve seat 68 to normally prevent the flow of fluid through passageway 66. However, if the differential fluid pressure across filter media 44 builds to a preselected pressure, seat 74 is displaced by compression of spring 76 to allow oil to flow from interior chamber 30 to the interior of perforated tube 38 and thereby through outlet port 32.

Figure 7:
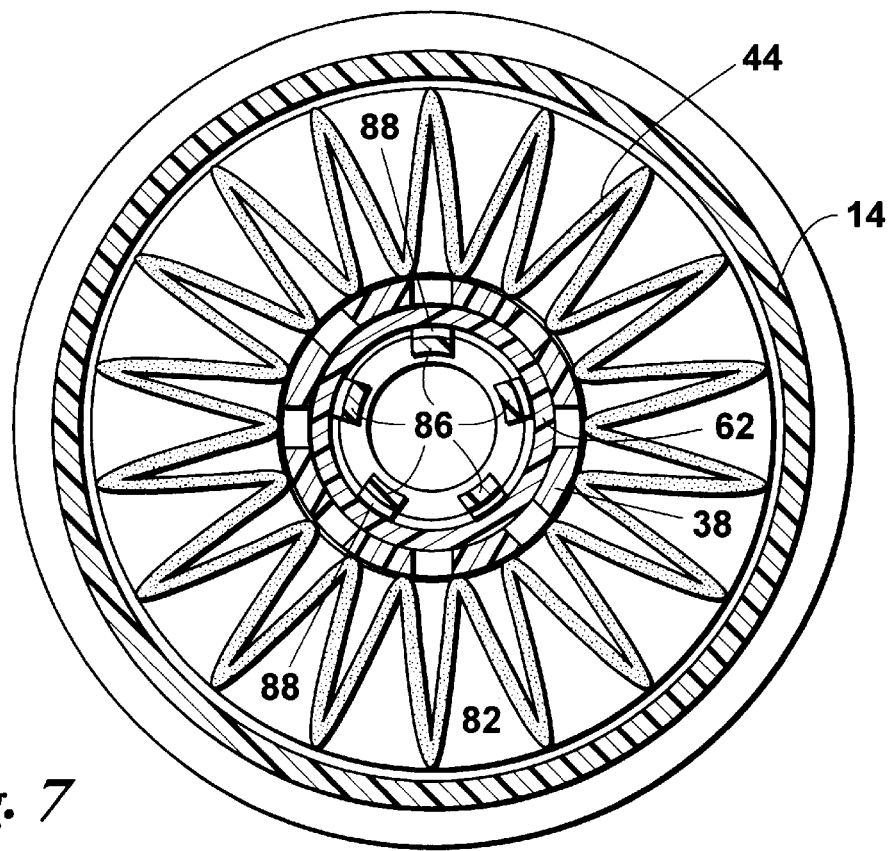
FIG. 7 is a cross-sectional view taken along the line 7—7 of FIG. 1 showing the system for removably attaching the filter element to the cover so that when the cover is threadably removed from engagement with the housing, the filter element conveniently remains within the cover.

An important feature of the filter 10 of FIGS. 1 and 8 is a provision whereby changing filter element 36 is simplified. When cover 14 is threadably disconnected from housing 12, filter element 36 remains within the cover and extends beyond the cover open end 80 so that the filter element can be manually grasped for removal from the cover. An important innovation is a means of removably retaining filter element 36 within cover 14 when the cover is disengaged from housing 12. This is accomplished by employing tubular housing 62. As seen in FIG. 1, the tubular housing 62 includes an inner annular groove 82. Integrally formed with cover 14 and positioned about a central axis of the cover are spaced apart upstanding legs 86, five of which are shown in FIG. 7. Each of legs 86 has a hook portion 88 at its outer end that normally extends within annular groove 82. Legs 86 are deflectable so that a filter element 36 may be detachably secured within cover 14 by pushing it downwardly so that the hook portions 88 snap in annular groove 82 within tubular housing 62.

To improve attachment of tubular housing 62 to the filter element, the tubular housing includes a radially extending flange portion 90 (See FIGS. 1 and 13) that is secured to filter element first end plate 46, such as by adhesive. Further, to properly position filter element 36 within interior chamber 30, tubular housing 62 includes spaced apart downwardly extending legs 92 (three being shown in FIG. 13) that engage the interior surface of cover 14 to properly position filter element 36 so that it sealably engages annular portion 54 of elastomeric disc 50.

Access is provided for fluid flow through passageway 66 of bypass valve tubular housing 62 by the path indicated by arrow 94 since legs 86 and 92 out of register with each other. Passageway 94 permits flow of fluid from within the filter through bypass valve 60 in the event of an excessive pressure differential across the filter element.

The cross-sectional views of FIGS. 3 through 7 show the details of construction and particularly, show the relationship of components so as to provide a clear illustration of the construction of the filter 10.

The basic components of the filter 10 of FIGS. 1 through 8 is intended to function as a permanent fluid filtration system, such as an oil filter for an internal combustion engine, and to remain essentially as a permanent part or at least a semi-permanent part of an engine. That is, housing 12 and cover 14 are preferably manufactured for long life, much longer than the usual life of the typical replaceable filter. Instead of discarding housing 12 and cover 14, a workman merely unscrews cover 14 that carries with it filter element 36. Cover 14 functions as a cup to hold filter element 46 and retains substantially all of the fluid (oil) contained within interior chamber 30. The filter element 46 is easily removable from cover 14 by pulling upwardly on the upper portion of the filter. Convenience is enhanced by the fact that the length of filter element 36 is greater than the interior height of cover 14. With upward pull on filter element 46, hook portions 88 of legs 86 are disengaged from annular groove 82 allowing the filter element 46 to be removed from the cover and disposed of.

Filter element 36 is formed preferably of essentially combustible components. That is, center tube 38 and bypass valve system tubular housing 62 are preferably formed of rigid plastic while the filter media 44 and end plates 46 and 48 are preferably formed of paper or paper like products. The only portion of the filter element as illustrated in FIGS. 1 through 7 and 13 that is not combustible is spring 76 so that the entire filter element can be disposed of by burning with very little solid residue. Burning provides useful heat energy and eliminates space required in a landfill.

When filter element 36 is removed it may also be desirable to remove and replace anti-drain back valve elastomeric disc 50.

The filter of FIGS. 1 through 8 is constructed in a way to minimize oil spillage when a filter element replacement is required. To further minimize spillage a drain plug 96 (see FIG. 1) is positioned in a threaded opening 98 in cover 14. By removing drain plug 96 before cover 14 is removed, the liquid contents of interior chamber 30 can be drawn down so that when cover 14 is removed to possibility of fluid spillage is greatly reduced.

Figure 9:
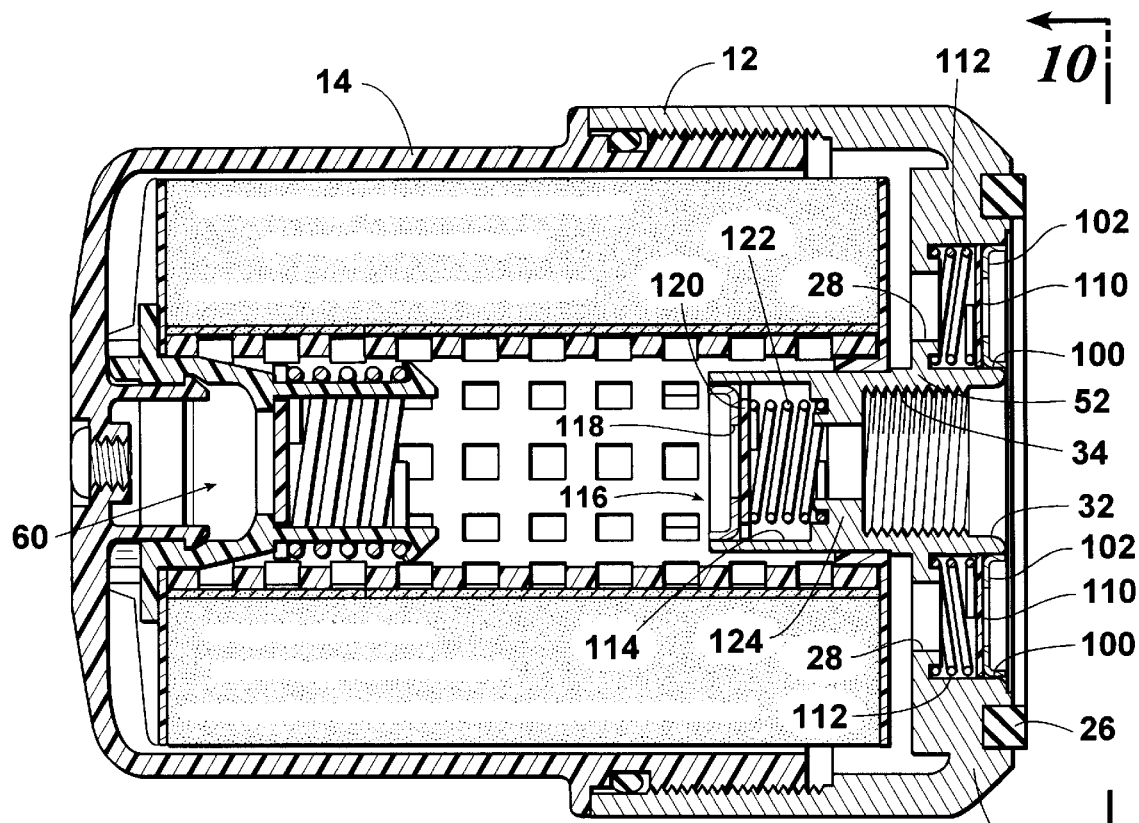
FIG. 9 is an elevational cross-sectional view of another embodiment of the oil filter of this invention. As compared with the cross-sectional view of FIG. 1.

The embodiment of FIGS. 1 through 8 includes, as has been described, an anti-drain back valve in the form of an elastomeric disc 50 which may need to be replaced periodically when a filter element 36 is replaced, that is, anti-drain back valve elastomeric disc 50 is not considered to be normally a permanent element that would last the life of housing 12 and cover 14. In contrast, an alternated embodiment of the invention illustrated in FIGS. 9, 10 and 11 has a permanent anti-drain back valve system. As seen in FIG. 9, in the housing integral mounting plate portion 22, surrounding each inlet port 28 there is an enlarged recess 100. Positioned within each recess 100 is a valve seat insert 102, illustrated in FIG. 11. Each insert 102 is formed of thin metal and includes a circumferential sidewall 104 with an integral flange portion 106 having a fluid passageway 108 therethrough.

Also positioned within each recess 100 is a valve disc or plunger 110 which may be of metal, tough plastic or fiberglass, and a spring 112.

Each anti-drain back valve as formed by elements 102 to 110 is held in the closed position by a spring 112 that is displaced in response to fluid pressure, provided such as by a lubrication system oil pump, to permit the flow of oil into the filter. The filter of FIG. 9 functions the same as that of FIG. 1, a basic difference being the anti-drain back valve system.

Figure 10:
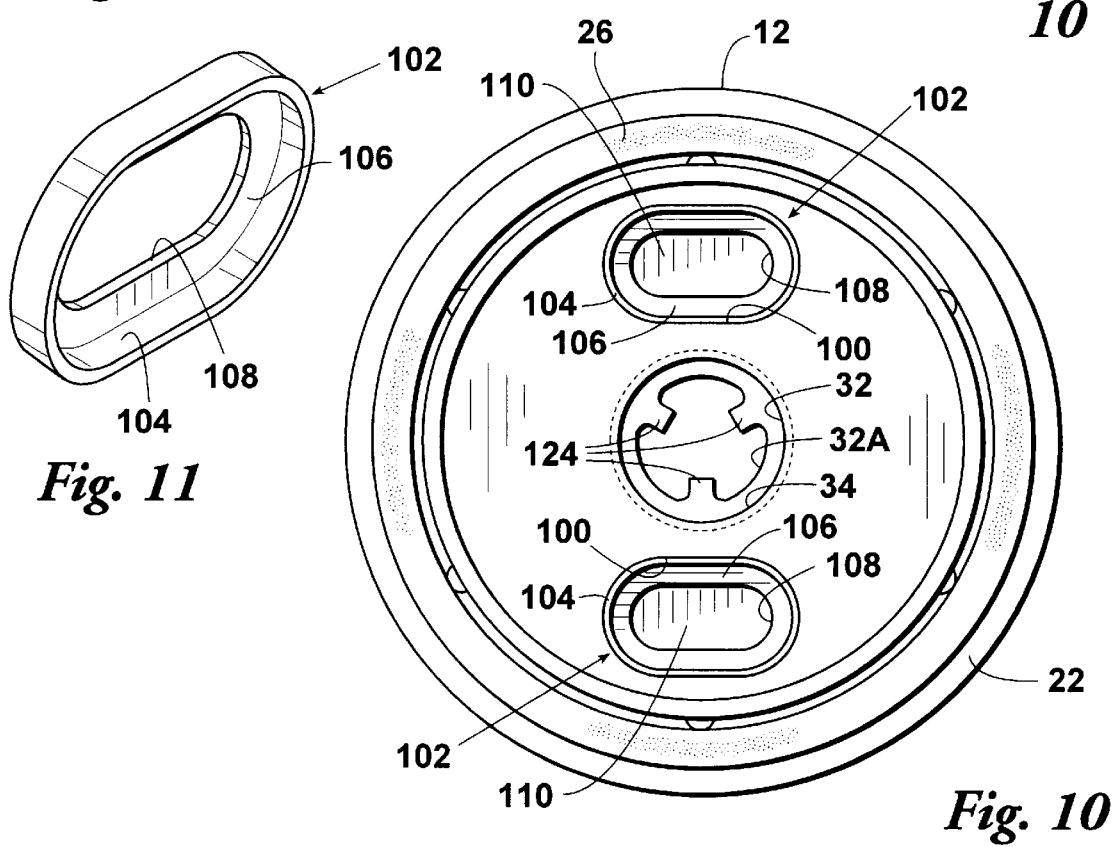
FIG. 10 is an external elevational view of the end plate portion of the housing as taken along the line 10—10 of FIG. 9 showing the construction of the anti-drain back valves.

FIG. 10 is an end view of the filter of FIG. 9 showing that the recesses 100 formed in mounting plate portion 22 of housing 12 are elliptical. Consequently valve seat insert 102 is elliptical to match the recess configuration. By providing elliptical recesses the maximum flow volume per inlet port is increased so that a reduced number of inlet ports are required. However, it is understood that instead of the recesses being elliptical, requiring elliptical shaped valve seat inserts 102, the recesses and the inserts could be circular.

Figure 11:
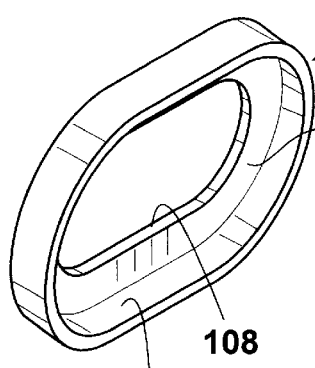
FIG. 11 is an isometric view of a valve seat insert as used in the embodiment of FIGS. 9 and 10.

Another difference in the embodiment of FIG. 9, compared to that of FIG. 1, is the provision of an outlet port anti-drain valve. Integrally formed with mounting plate portion 22 of housing 12, as a portion of the tubular extension 52, is a cylindrical recess 114 in axial alignment with fluid outlet port 32. A valve seat insert is generally indicated by 116 that is formed of thin metal and formed in the same way as valve seat insert 102 as shown in FIGS. 10 and 11 except that valve seat 116 is circular rather than elliptical. A fluid passageway opening 118 is provided in valve seat 16.

Positioned within recess 114 is a valve disc 120 (that may also be termed a valve plunger) in the form of a flat element, made of metal, tough plastic or fiberglass, that is urged against valve seat insert 116 by a spring 122. Thus, fluid passageway 118 is normally closed by the force of spring 122 until the pressure differential across the valve disc 120 exceeds the force of spring 122 causing the valve to open.

As seen in FIG. 10, the configuration of fluid passageway 32A includes integral projections 124 that serve to capture one end of spring 122. Projections 124 provide a backup for spring 122 while permitting fluid flow through outlet port 32A.

Thus the embodiment of FIG. 9 provides anti-drain back valves at inlet ports 28, a bypass valve 60 of the same type as described with reference to FIG. 1, and an outlet port anti-drain valve. The system of FIG. 9 insures that the inlet port as well as the outlet port are closed except when subjected to fluid pressure, such as from an engine lubrication system oil pump to thereby prevent drainage when cover 14 is removed.

Figure 12:
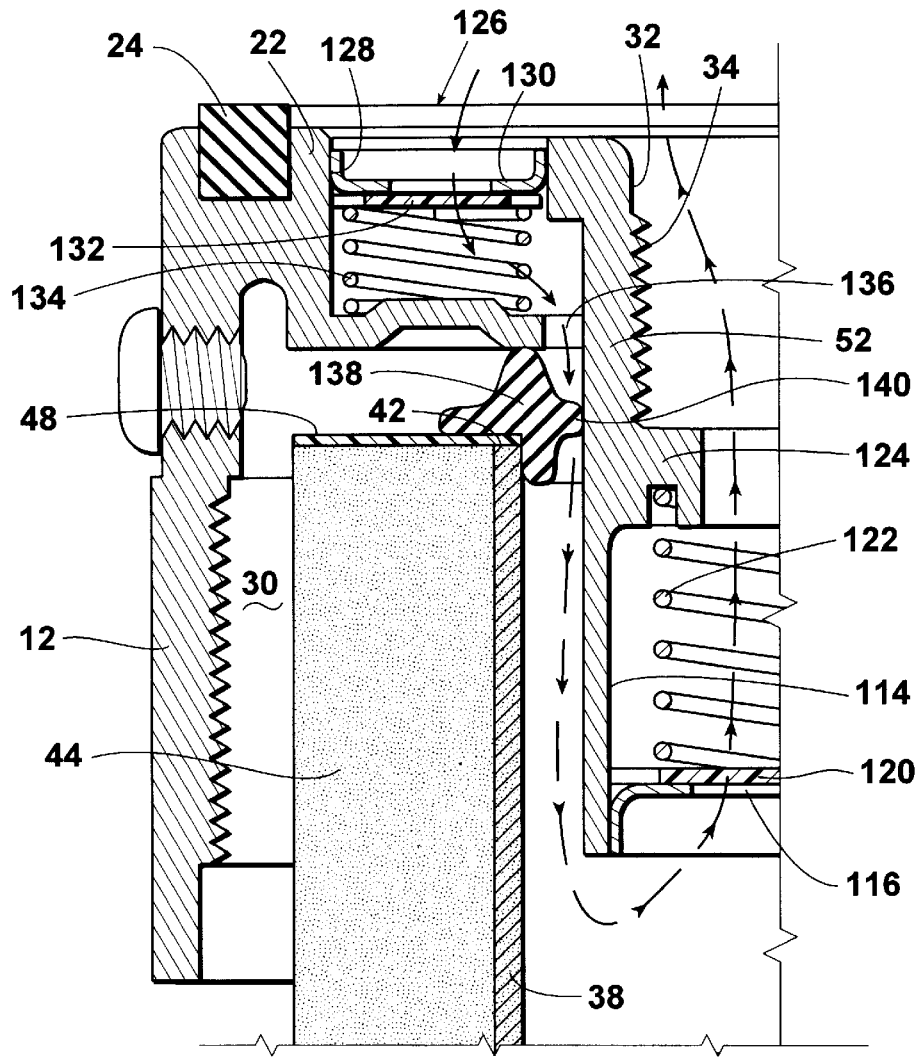
FIG. 12 is an elevational partial cross-sectional view of another design showing a different type of bypass valve system that is formed in conjunction with a circumferential grommet. One or more spring loaded bypass valves are formed in parallel with inlet ports in the mounting plate portion of the housing. When the filter element becomes blocked, the bypass valve or valves open applying oil pressure to the back side of the grommet to displace a lip portion allowing oil flow directly to the housing outlet port.

FIG. 12 shows an alternate embodiment of the invention employing a completely different bypass valve placement. The bypass valve in this arrangement is generally indicated by numeral 126 and is formed in a recess 128. A valve seat insert 130, a valve disc 132 and a spring 134 are substantially similar to the anti-drain back valves formed of elements 100 through 112 as seen in FIGS. 9 and 10, are positioned in recess 128. However, the modified bypass valve 126 of FIG. 12 is different in that, instead of a fluid inlet port 28 as shown in FIG. 9, the recess 128 of the valve of FIG. 12 has an open side port 136 in the direction towards tubular extension 52.

Supported circumferently of tubular extension 52 is a toroidal grommet 138. The second end 42 of the filter element that includes center tube 38 sealably engages grommet 138. The grommet seals against the mounting plate portion 22 of cover 14 around the full perimeter of tubular extension 52. An integral inwardly radially extending lip portion 140 of grommet 138 circumferently seals around the exterior circumference of tubular extension 52.

When the pressure drop through the filter element reaches a predetermined level, valve disc 132 is displaced away from the seat formed by valve seat insert 130 to allow inlet fluid flow that passes through spring 134 and open side port 136. The pressure of this fluid flow displaces grommet lip portion 140 allowing inlet fluid to pass directly to the interior of center tube 38 and thereby directly through the anti-drain valve outlet port that includes disc 120 so that thereby fluid flow continues even when the filter element has accumulated contaminants to the point that excessive pressure drop builds up across the filter element.

Bypass valves as illustrated in FIG. 12 are positioned alternately between the anti-drain back valves as seen in FIGS. 9, 10 and 11, that is, referring to FIG. 10, bypass valve of the type shown in FIG. 12 would be spaced 180° relative to the anti-drain back valves. When a bypass valve (or valves) of the type shown in FIG. 12 is employed the filter element 36 will not require a bypass valve so the first end plate 46 of the filter element can be closed or fluid passageway 66 of the bypass valve system 60 can be closed, eliminating the need for legs 70, valve disc 74 and spring 76. In other words, if the bypass valve system of FIG. 12 is combined with an anti-drain back valve system of FIG. 9 all valve structures required by the filter are permanently formed as a part of housing 12.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. A fluid filter element comprising:

a concave housing including a peripheral sidewall coaxially surrounding a central axis and defining a chamber, wherein said peripheral sidewall includes a first axial end that is closed by an end wall and a second axial end that is open, wherein said end wall includes an exterior surface adapted to be mounted to a fluid using apparatus and an interior surface facing said chamber, an outlet port coaxially surrounding said central axis and extending axially through said end wall, an inlet port extending axially through said end wall and being radially spaced apart from said outlet port, wherein said inlet port includes a first section extending from said exterior surface of the end wall and a second section extending from said interior surface of the end wall, said first section having a larger cross sectional area than a cross sectional area of said second section whereby said first section defines a recess for receiving a check valve therein, and a peripheral shoulder extending radially inwardly from a peripheral inner surface of said first section for receiving an end of a spring associated with said check valve;

a concave cover removably and sealably attached to said second axial end of the peripheral wall of said housing for closing said chamber;

an elongated disposable filter element removably supported within said chamber, the filter element having a foraminous center tube, and a first end of which is in detachable communication with said fluid outlet port, a second end of the center tube being closed by a closure element, the center tube being coaxially surrounded by filter media whereby fluid flow into said chamber through said inlet port flows radially through said filter media into said center tube and out through said outlet port; and a check valve including a seat member having an opening therethrough fitted into said recess, a valve disc positioned in said recess and adjacent said seat member and a spring positioned in said recess wherein said spring has a first end in contact with said valve disc and a second end in contact with said peripheral shoulder for urging said valve disc into closed contact with said seat member, the valve disc being displaceable by the pressure of incoming fluid flow to permit fluid flow through said inlet port in a direction from the exterior surface of said end wall toward the interior surface of said end wall and prohibiting back flow of fluid out through said inlet port in a direction from the interior surface of said end wall toward the exterior surface of said end wall.

2. A fluid filter according to claim 1 wherein said valve disc is formed of sheet metal and is press fitted into said recess.

3. A fluid filter according to claim 1 wherein said closure element closing the filter element center tube second end is a bypass valve.

4. A fluid filter comprising:

a housing body adapted for attachment to a fluid using machine and having a fluid inlet port and a fluid outlet port;

a concave cover sealably attachable to and detachable from said housing body providing when so attached, a closed area with which said inlet and outlet ports communicate and having an internal end surface with attachment legs extending therefrom;

a disposable filter element removably supported within said closed area having a perforated center tube having first and second ends and filter media therearound and an end plate at each of said ends, said first end of said center tube being in closed detachable communication with said fluid outlet port;

a tubular housing having a major portion thereof received within said second end of said center tube and having an external circumferential flange portion in contact with said end plate at said second end of said center tube and having support legs extending therefrom in contact with said internal end surface of said cover serving to force said first end of said center tube into sealed engagement with said outlet port of said housing body, said tubular housing detachably receiving said attachment legs whereby said filter element is removed with said cover as said cover is detached from said housing; and a normally closed bypass valve within said tubular housing that opens to permit fluid flow therethrough when a pressure drop of fluid flow through said filter media exceeds a preselected value.

5. A fluid filter according to claim 4 wherein said tubular housing has an internal circumferential groove and wherein said attachment legs releasably engage the circumferential groove to removably secure said filter element to said cover.

6. A fluid filter according to claim 4 wherein said filter element is of a length greater than the length of said cover whereby said filter element extends, in part, externally of said cover when said cover is removed from said housing.

7. A fluid filter according to claim 4 wherein said outlet port is centrally positioned in said housing and wherein said inlet port is in the form of at least one inlet port opening spaced from said outlet port and including an anti-drain back valve in the form of flexible elastomeric disc surrounding said outlet port and covering said at least one inlet port, the flexible disc being displaceable by fluid inlet flow.

8. A fluid filter according to claim 7 wherein said elastomeric disc serves the additional function of sealing said closed and detachable communication of said filter element center tube with said fluid outlet port.

9. A fluid filter according to claim 4 wherein said housing has a recess having a flow passageway therethrough forming said inlet port and including:

a seat member having an opening therethrough fitted into said recess;

a valve disc positioned in said recess and adjacent said seat member; and a spring positioned in said recess and urging said valve disc into closed contact with said seat member, the valve disc being displaceable by the pressure of incoming fluid flow to permit fluid flow inwardly through said inlet port but prohibiting back flow of fluid out through said inlet port.

10. A fluid filter according to claim 9 wherein said valve disc is formed of sheet metal and is press fitted into said recess.

11. A fluid filter according to claim 4 including an anti-drain back valve in communication with said fluid inlet port of said housing serving to permit inward fluid flow and resist outward fluid flow through said inlet port.

12. A fluid filter according to claim 11 wherein said outlet port is centrally positioned in a first end of said housing body and wherein said inlet port is in the form of at least one inlet port opening spaced from said outlet port and wherein said anti-drain back valve is in the form of a flexible elastomeric disc surrounding said outlet port and covering said at least one inlet port, the flexible disc being displaceable by fluid inlet flow.

13. A fluid filter according to claim 12 wherein said flexible elastomeric disc serves the additional function of sealing said closed detachable communication of said first end of said center tube with said fluid outlet port.

* * * * *